(12) United States Patent
Takahira

(10) Patent No.: US 6,321,810 B1
(45) Date of Patent: Nov. 27, 2001

(54) PNEUMATIC TIRE WITH SPECIFIED STEEL BELT CORD

(75) Inventor: Kouzi Takahira, Nara (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 08/892,567

(22) Filed: Jul. 14, 1997

Related U.S. Application Data

(63) Continuation of application No. 08/621,371, filed on Mar. 25, 1996, now abandoned, which is a continuation of application No. 08/396,186, filed on Feb. 24, 1995, now abandoned, which is a continuation of application No. 08/183,641, filed on Jan. 19, 1994, now abandoned, which is a continuation of application No. 07/830,539, filed on Jan. 31, 1992, now abandoned, which is a continuation of application No. 07/350,418, filed on May 11, 1989, now abandoned.

(30) Foreign Application Priority Data

May 20, 1988 (JP) .................................. 63-124698
Mar. 1, 1989 (JP) ...................................... 1-49194

(51) Int. Cl.⁷ .............................. B60C 9/00; B60C 9/18; B60C 9/20; D07B 1/06
(52) U.S. Cl. ............................. 152/527; 57/902; 152/451
(58) Field of Search .................... 152/451, 527; 57/902

(56) References Cited

U.S. PATENT DOCUMENTS

| 3,778,993 | * | 12/1973 | Glushko et al. | 57/212 X |
|---|---|---|---|---|
| 3,785,423 | * | 1/1974 | de Carbon | 152/327 |
| 4,158,946 | * | 6/1979 | Bourgois | 57/902 X |
| 4,169,495 | * | 10/1979 | Maiocchi | 152/527 |
| 4,399,853 | | 8/1983 | Morimoto et al. . | |
| 4,454,903 | * | 6/1984 | Noël et al. | 152/527 |
| 4,464,892 | * | 8/1984 | Kleijwegt | 152/451 X |
| 4,506,500 | * | 3/1985 | Miyauchi et al. | 57/902 X |
| 4,523,619 | * | 6/1985 | Gouttebessis | 152/527 |
| 4,586,324 | * | 5/1986 | Mizuma | 152/451 X |
| 4,709,544 | * | 12/1987 | Charvet | 152/451 X |
| 4,715,419 | * | 12/1987 | Kawasaki et al. | 152/527 |
| 4,738,096 | * | 4/1988 | Hatakeyama et al. | 152/527 X |

FOREIGN PATENT DOCUMENTS

| 168857 | * | 6/1985 | (EP) | 152/451 |
|---|---|---|---|---|
| 1313763 | * | 11/1962 | (FR) | 152/527 |
| 0018206 | * | of 1893 | (GB) | 57/213 |
| 59156805 | * | 9/1984 | (JP) . | |
| 6241339 | * | 2/1987 | (JP) . | |
| 60189604 | * | 9/1985 | (JP) | 152/451 |
| 59-156805 | * | 9/1984 | (JP) | 152/527 |
| 62-41339 | * | 2/1987 | (JP) | 57/902 |

OTHER PUBLICATIONS

"Rubber Articles Reinforced With High Tensile Steel Cord", Research Disclosure No. 18441, Aug. 1979.*
Peeters et al., "New Developments in Steel Cords for Tyres", *International Polymer Science and Technology*, vol. 11, No. 10, 1984, pp. T153–T160.*
*Mechanics of Pneumatic Tires*, ed. Samuel K. Clark: Washington, D.C., National Bureau of Standards, 1971, p. 113.*

* cited by examiner

Primary Examiner—Adrienne C. Johnstone
(74) Attorney, Agent, or Firm—Jordan and Hamburg LLP

(57) ABSTRACT

In the pneumatic tire of this invention, at least the outermost one of a plurality of rubber layers between the carcass and tread has been reinforced with a plurality of steel cords. Each of these steel cords is a single-strand steel cord with an elongation at break of not less than 4% and at least one of its component wires does not form a common circumcircle with the remaining wires. The curve circumscribing the cross-sections of the constituent wires of each steel cord is not a true circle. Furthermore, a high resistance to nail penetration is assured by arranging the steel cords in such a manner that, for a large majority of steel cords, the direction of maximum offset span of the circumscribing curve is substantially coincidental with the width direction of the outermost layer of rubber.

2 Claims, 3 Drawing Sheets

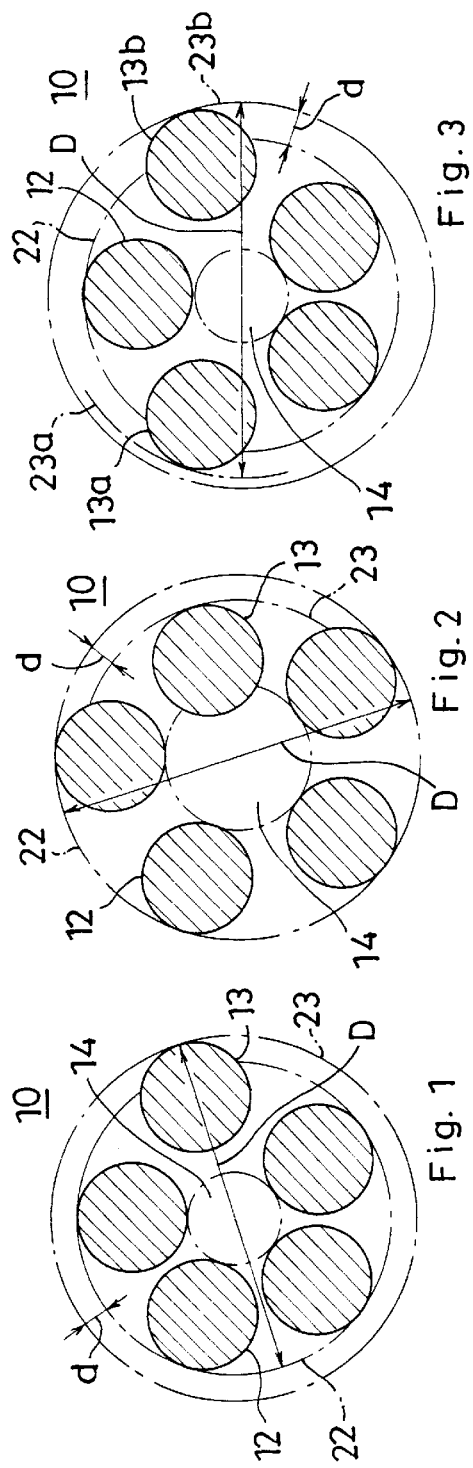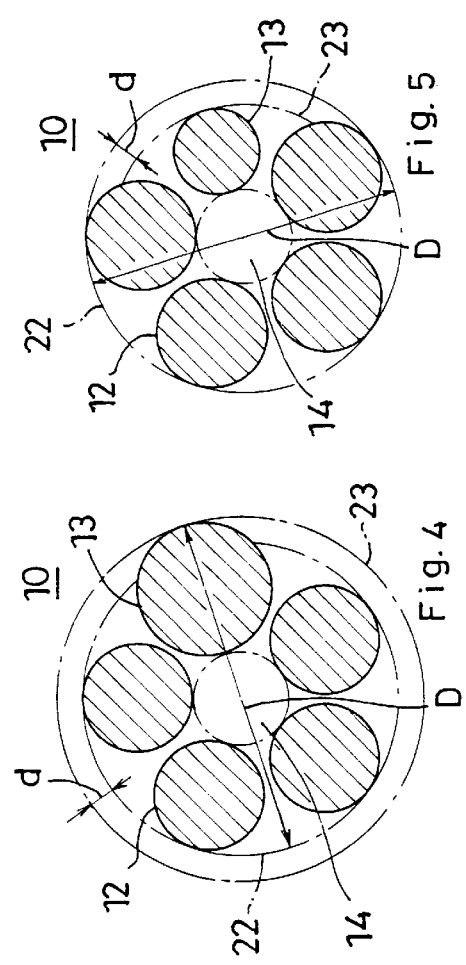

PNEUMATIC TIRE WITH SPECIFIED STEEL BELT CORD

This application is a continuation, of application Ser. No. 08/621,371 filed Mar. 25, 1996, now abandoned, which is a continuation of application Ser. No. 08/396,186 filed Feb. 24, 1995, now abandoned, which is a continuation of application Ser. No. 08/183,641 filed Jan. 19, 1994, now abandoned, which is a continuation of application Ser. No. 07/830,539 filed Jan. 31, 1992, now abandoned, which is a continuation of application Ser. No. 07/350,418 filed May 11, 1989, now abandoned.

BACKGROUND OF THE INVENTION

In the bias-ply automotive pneumatic tire, carcass-protective reinforcing layers, known as breakers, are interposed between the carcass and the tread. In the radial-ply tire, reinforcing layers called "belts" are interposed between the carcass and the tread and serve to brace up the carcass in the radial direction. In such a pneumatic tire, it is common practice to increase the service life of the tire by embedding steel cords in the breakers or belts.

This invention relates to a pneumatic tire in which the rubber layer, i.e. said breaker or belt, between the carcass and tread has been reinforced with steel cords.

The breaker or belt is often constructed in a plurality of layers. Particularly when the anti-cut property of a pneumatic tire must be increased, a plurality of steel cords capable of sufficient elongation are embedded at appropriate spacings in the outermost, i.e. adjacent to the tread, layer of the aforementioned breaker or belt.

In the conventional steel cord, it is common practice, as explained below, to implement a large elongation value by adopting a multi-strand structure.

FIGS. 9 and 10 are cross-section views showing the multi-strand steel cords heretofore used in the conventional pneumatic tire; thus, FIG. 9 represents the 4×4×0.23 construction, while FIG. 10 represents the 3×7×0.22 construction.

Referring to FIG. 9, a steel cord 10 is an assembly of four strands 16 twisted together and each strand 16, in turn, is an assembly of four constituent wires 12, each constituent wire 12 being a steel wire with a diameter of 0.23 mm. The twisting pitch of these constituent wires 12 is 3.5 mm and that of the strands 16 is 5.5 mm.

The steel cord 10 illustrated in FIG. 10 is an assembly of three strands 16 twisted together. Each strand 16 is an assembly of seven constituent wires 12 and each of the wires 12 is a steel wire with a diameter of 0.22 mm. The twisting pitch of the wires 12 is 4.0 mm and that of the strands 16 is 7.5 mm.

Since each of these steel cords 10 is a low-pitch multi-ply structure, it has a large elongation and is flexible, insuring a large impact-absorbing or damping capacity. Therefore, the conventional pneumatic tires utilizing these steel cords 10 had high anti-cut properties.

The conventional tires employing steel cords of the above-described constructions present the following problems, however.

Thus, in the conventional multi-strand steel cords 10, the degree of so-called "twisting loss" of tenacity or strength is high and the strength of the respective wires 12 cannot be effectively utilized. In order to obtain a desired strength for steel cord 10, an increased number of constituent wires 12 is required but the use of so many wires 12 adds to the overall weight of the steel cord 10. Moreover, since the steel cord 10 used heretofore is a flexible steel cord, the pneumatic tire is markedly deformed on the tread to create a large rolling resistance, thus detracting from milage.

Furthermore, as will be apparent from FIGS. 9 and 10, the wires 12 in the conventional construction are round in section and disposed in close contact and, for this reason, a closed air space 18 is created in the approximate center of the constituent wires. Therefore, in this steel cord 10, rubber does not easily enter and fill the space 18. In other words, the resulting breaker or belt will have the space 18 unfilled with rubber. If the tread of the tire is damaged and consequently water finds its way from the site of injury into the space 18, the invading water migrates within the space 18 along the length of steel cord 10 and, also, remains entrapped therein. Consequently the steel cord 10 becomes rusted with time, detracting from the strength of bond to the rubber. If this decrease in bond strength progresses, there occurs the trouble known as "separation".

Therefore, the present applicant previously proposed, in the copending Japanese Patent Application No. 79399/1988, "a pneumatic tire in which the rubber layer between the carcass and tread has been reinforced with single-strand steel cords with an elongation at break of not less than 4%".

FIG. 11 is a cross-section view showing the steel cord used in the pneumatic tire according to the above patent application which remains yet to be laid open.

This steel cord 10 is a single-strand cord of 1×5×0.38 construction. Thus, it is an assembly of five wires 12 each having a diameter of 0.38 mm. The twisting pitch is 6.5 mm and the elongation at break of the cord is 6.5%.

Despite being a single-strand cord, this steel cord 10 has an elongation at break of not less than 4% and, therefore, offers an anti-cut performance comparable to that of a multi-strand steel cord. Furthermore, because of the very single-strand construction, the rate of wire tenacity utilization is high. This means that the desired tire strength is attainable even if the overall weight of the tire cord is decreased, and that accordingly a lightweight pneumatic tire can be implemented. Moreover, because of the adequate flexural hardness of the steel cord 10, the rigidity of the pneumatic tire is enhanced. Therefore, the deformation and, hence, rolling resistance of the tire are reduced, thus contributing to milage. Furthermore, since clearances are created between constituent wires 12 at intervals along the length of the steel cord, the space 14 enclosed by the wires 12 is exposed to the atmosphere. Therefore, in the vulcanization of the pneumatic tire having a breaker or belt in which this steel cord 10 has been embedded, the rubber finds its way readily into the space 14 and as the space is thus filled with the rubber, the incidence of "separation" is virtually inhibited.

However, even in the case of a steel cord having the same 1×5×0.38 construction, its anti-cut property is poor when its twisting pitch is as large as 18.0 mm and its elongation is as small as, for example, 2.5%. In addition, as illustrated in FIG. 12, a closed space 18 is formed by and among the wires 12. Therefore, in the result of arresting the entry of rubber into the space 18, this cord is equivalent to the aforementioned multi-strand cord.

In the pneumatic tire disclosed in the copending patent application mentioned above, the wires 12 are identical in diameter and shaping rate so that all the wires 12 form one common circumcircle 22. Therefore, though the incidence of separation is inhibited, the effect of anchoring the steel cord in the rubber constituting the breaker or belt is so small that the separation once started tends to grow easily.

Having been accomplished in view of the above situation, this invention has as its object to provide a pneumatic tire in which the strength or tenacity of material wires is effectively exploited, while maintaining the anti-cut property of the tire at a level comparable to that of the conventional tire, to thereby improve the rigidity of the tire while the incidence and growth of separation having been successfully inhibited.

SUMMARY OF THE INVENTION

This invention relates to a pneumatic tire characterized in that, of the breaker or belt consisting of a plurality of rubber layers which is disposed between the carcass and the tread, at least the outermost layer has been reinforced with a plurality of steel cords, each of which is a single-strand cord with an elongation at break of at least 4 percent, with the constituent wires of the cord forming no single common circumcircle. The shaping rate is a ratio of a diameter of a circumcircle defined by a hypothetical cord formed of a plurality of wires, with the plurality of wires being shaped, to a diameter of a circumcircle defined by the hypothetical cord with the plurality of wires not being shaped and each of the plurality of wires contacting neighboring ones of the plurality of wires.

The steel cord made up of constituent wires forming no single common tangent circle, that is to say a steel cord in which the curve circumscribing the cross-sections of all of its constituent wires is not a true circle, can be implemented by varying the shaping rate of some of its constituent wires or varying the diameter of some of its constituent wires from that of the other wires. Alternatively, a steel cord having a true circumcircle may be flattened by means of a roller.

Since, in the pneumatic tire of this invention, the steel cord has a high elongation at break of not less than 4%, it has an anti-cut property equivalent to that of a multi-strand cord. Moreover, as the steel cord is a single-strand cord, the rate of wire tenacity utilization is improved. Therefore, the desired cord strength can be realized even if the overall weight of the steel cord is decreased, thus enabling the provision of a lightweight pneumatic tire. Furthermore, in accordance with this invention, a high tire rigidity is assured by the adequate flexural hardness of the steel cord. Therefore, the deformation and, hence, rolling resistance of the tire are decreased to insure a greater milage. Furthermore, since the space defined by the constituent wires is locally exposed to the atmosphere to allow the entry of rubber, the incidence of separation is successfully inhibited. Moreover, as the constituent wires have no single common circumscribed circle, the steel cord of this invention has surface irregularities. Therefore, the bonding interface between the steel cord and rubber is discrete and accordingly the distribution of the shear strain produced between the steel cord and rubber during driving is also dispersed. That is to say, even if a minor separation occurs, its propagation or growth is inhibited.

However, even with this steel cord, if the direction of maximum offset span of the curve circumscribing the cross-sections of the constituent wires is random for the respective steel cords, it will happen that the direction of maximum offset span of some circumscribed curves coincide with the thickness direction of the outermost layer so that the interval between the steel cord ends may be increased to a greater extent than in the conventional tire to thereby increase the chances of entrapping of nails and other foreign bodies.

To overcome the above disadvantage, the pneumatic tire of this invention is so designed that, with respect to substantially all of the steel cords, the direction of maximum offset span of circumscribed curves is substantially coincidental with the width direction of the outermost layer. Since, in this pneumatic tire, the interval between steel cord ends is small, the resistance to nail penetration has been improved. The substantial alignment of the directions of the steel cord circumscribed curves can be achieved, for example by orienting the steel cords by means of grooves formed in a calender and applying the rubber to the cords.

BRIEF DESCRIPTION OF THE DRAWINGS

FIG. 1 is a cross-section view showing a pneumatic tire steel cord embodying the principle of this invention;

FIG. 2 is a cross-section view showing another pneumatic tire steel cord embodying the principle of this invention;

FIG. 3 is a cross-section view showing a still another pneumatic tire steel cord embodying the principle of this invention;

FIG. 4 is a cross-section view showing yet another pneumatic tire steel cord embodying the principle of this invention;

FIG. 5 is a cross-section view showing a further different pneumatic tire steel cord embodying the principle of this invention;

DETAILED DESCRIPTION OF THE PREFERRED EMBODIMENTS

Figure 6:
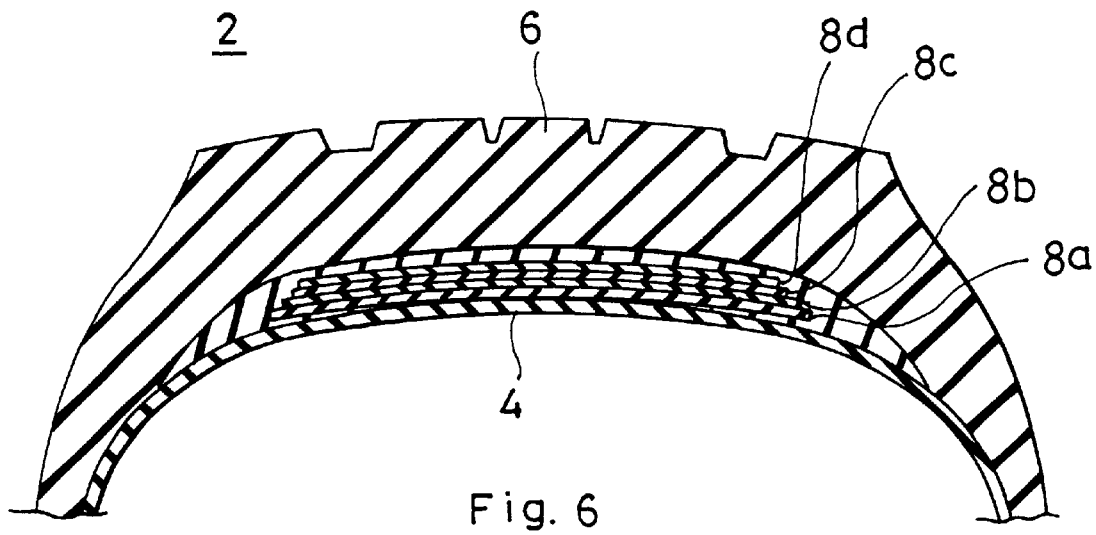
FIG. 6 is a partial section view showing a pneumatic tire embodying the principle of this invention, in which the outermost layer of rubber between the carcass and tread has been reinforced with the steel cord illustrated in FIG. 4.

This invention is described in detail below, reference being had to the accompanying drawings.

Referring to FIG. 1 which is a cross-section view showing a pneumatic tire steel cord embodying the principle of this invention, a steel cord 10 is a steel cord of the 1×5×0.38 single-strand construction, that is to say, a twisted assembly of five constituent steel wires, each having a diameter of 0.38 mm. Of the five constituent steel wires of the same diameter, one wire 13 has a higher shaping rate than the other four wires 12. Therefore, though the center of the circumscribed circle 23 of the wire 13 coincides with the center of the steel cord 10, its radius is larger by d than that of the common circumcircle of the other constituent wires 12. This radius differential d is 0.06 mm. The maximum offset span is represented by the symbol D. The twisting pitch of constituent wires 12 and 13 is 6.5 mm and the elongation at break of the steel cord 10 is 6.7%. Moreover, local gaps with a width of at least about 0.02 mm are formed between the constituent wires along the length of the cord, so that the space 14 defined by the wires is exposed to the atmosphere. Therefore, in the vulcanization of a radial-ply tire having a belt in which this steel cord 10 is embedded, the rubber may enter the space 14 through said gaps between the constituent wires to fill the space 14.

FIGS. 2 through 5 are cross-section views showing modifications of the steel cord 10.

In the aspect of being a single-strand construction consisting of 5 constituent wires, these steel cords 10 are invariably similar to the steel cord 10 illustrated in FIG. 1.

However, in the steel cord 10 shown in FIG. 2, the shaping rate of one constituent wire 13 is smaller than that of the other four wires 12. In the steel cord 10 shown in FIG. 3, the shaping rate of one constituent wire 13a is larger than that of three constituent wires 12, with the shaping rate of the remaining wire 13b being still larger than that of said wire 13a. Thus, by varying the shaping rate of one or more constituent wires from that of the remaining wires, there can be implemented a steel cord 10 consisting of component wires devoid of a common circumcircle. Thus, a circumscribing curve which is not a true circle with respect to the cross-sections of all the constituent wires can be realized. As an alternative method, a steel cord having a circumcircle may be flattened by means of a roller.

A similar steel cord 10 can also be implemented by varying the diameter of one or more constituent wires from that of the remaining wires. In the steel cord 10 illustrated in FIG. 4, the shaping rate is the same for the five constituent wires but the diameter of one constituent wire 13 is larger than that of the other four wires 12. In the steel cord 10 illustrated in FIG. 5, one constituent wire 13 is finer than the other four constituent wires 12.

In all of these versions illustrated and described, the aspect of the interwire space 14 being exposed is the same as in the embodiment shown in FIG. 1.

FIG. 6 is a partial sectional view showing a radial-ply tire having a belt in whose outermost layer steel cords 10 embedded. In this view, however, the steel cords 10 are not shown.

The radial-ply tire 2 illustrated in FIG. 6 has a size of 11 R 22.5 and includes four belts 8a, 8b, 8c and 8d between a carcass 4 and a tread 6. Embedded in the three belts 8a, 8b and 8c on the carcass side are steel cords of the 3×0.20+6× 0.35 construction. This means that each of these steel cords consists of three steel wires with a diameter of 0.20 mm and six steel wires with a diameter of 0.35 mm. The density of cords is 12 cords per 2.5 cm. These three belts 8a, 8b and 8c brace the polyester-ply carcass 4 in the radial direction. Embedded in the outermost layer belt 8d are the steel cords 10 illustrated in FIG. 1. Thus, the belt 8d is prepared by orienting steel cords 10 in parallel, applying a rubber composition thereto from both sides to form a rubber layer 11 and vulcanizing the rubber layer 11. In this belt 8d, too, the density of cords is 12 cords per 2.5 cm. It should be understood that, for insuring a better adhesion to the rubber, all the steel wires are brass-plated.

The three belts 8a, 8b and 8c function as hoops for the carcass 4. The outermost layer belt 8d contributes to the anti-cut property of the radial-ply tire 2 as will be explained hereinafter.

Referring to the radial-ply tire 2 according to the above embodiment of this invention, the characteristics of the steel cord 10 are set forth in Table 1 and the characteristics of the outermost layer belt 8d and those of the tire itself are set forth in Table 2, all as Example 1.

Figure 9:
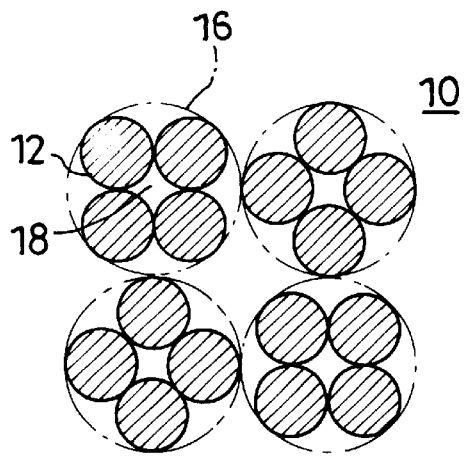
FIG. 9 is a cross-section view showing the conventional steel cord.
Figure 10:
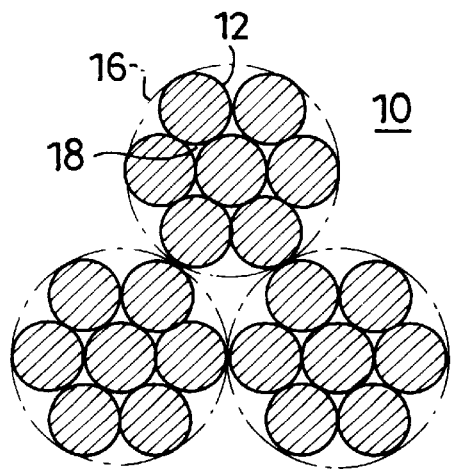
FIG. 10 is a cross-section view showing another conventional steel cord.
Figure 11:
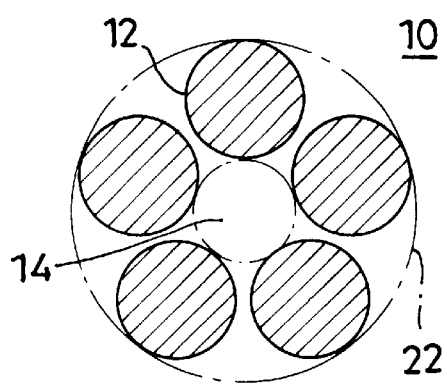
FIG. 11 is a cross-section view showing the pneumatic tire steel cord according to the copending patent application.
Figure 12:
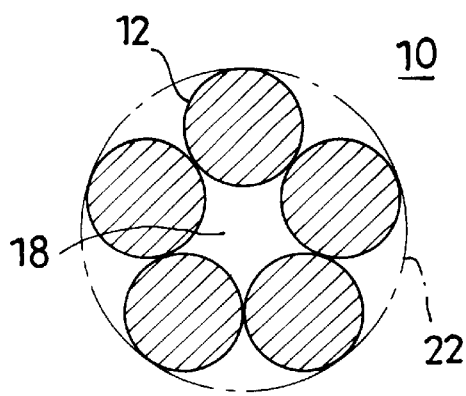
FIG. 12 is a cross-section view showing a comparative example with respective to the tire cord illustrated in FIG. 11.

The two tables mentioned above show the characteristics of four comparative examples as well. Comparative Example 1 relates to steel cords of the single-strand construction illustrated in FIG. 11; Comparative Example 2 relates to the multi-strand construction illustrated in FIG. 9; Comparative Example 3 relates to the multi-strand construction illustrated in FIG. 10; and Comparative Example 4 relates to the single-strand construction illustrated in FIG. 12. The pneumatic tires according to these respective comparative examples are 11 R 22.5 radial-ply tires comparable to the radial-ply tire of Example 1 and the carcass 4 and the three belts 8a, 8b and 8c are the same as those of Example 1. Embedded in the outermost belts 8d are the above-mentioned steel cords specific to the respective comparative examples.

Despite being of the single-strand construction, the steel cord 10 according to Example 1 has a small twisting pitch of 6.5 mm and an elongation at break of 6.7%, thus being comparable to the multi-strand cords of Comparative Examples 2 and 3 in terms of elongation property. Furthermore, as shown in Table 1, a Sharpy impact test revealed that the damping property of the tire of Example 1 is comparable to that of the tires of Comparative Examples 2 and 3. These data suggested that the pneumatic tire of Example 1 insures an anti-cut performance equivalent to that of the tire implemented with steel cords of the multi-strand construction. Actually, in the 30,000 kilometer rugged terrain field trial performed on a quarry ground using large-sized dumping cars equipped with the respective radial-ply tires, the tire of Example 1 showed an anti-cut performance comparable to that of the pneumatic tires according to Comparative Examples 2 and 3. The determination of anti-cut property was performed in the following manner. Thus, if a cut penetrating through the tread 6 and reaching the belt 8d occurs, cutting of the steel cord 10 embedded in the belt may or may not occur depending on cases. The cord cut rates shown in Table 2 each is the number of cord cuts relative to the total number of cuts. It should be noted that as to the steel cord 10 according to Comparative Example 4, because its twisting pitch is as large as 18.0 mm, just as in the conventional tire, its elongation is as small as about 2.5% and, therefore, this tire has a poor anti-cut property.

Furthermore, the wire tenacity utilization rate of the steel cord of Example 1 is not so high as that of Comparative Example 4 but is higher than those of Comparative Examples 2 and 3. Therefore, the overall cord weight necessary for achieving a given cord strength is less than that in Comparative Examples 2 and 3, thus contributing to reduced tire weight. Moreover, because of the adequate flexural hardness of the steel cord 10 in Example 1, the tire rigidity is higher and the rolling resistance is smaller as compared with Comparative Examples 2 and 3. Therefore, a better milage can be expected with the pneumatic tire of Example 1.

Furthermore, because rubber finds its way efficiently into the space 14 defined by the constituent wires 12, the pneumatic tire of Example 1 showed no separation of belt 8d in sharp contrast with Comparative Examples 2 to 4. In this respect, Example 1 was comparable to Comparative Example 1.

The results of the dynamic separation test with the respective tires are also shown in Table 2. For use as specimens for this test, two outermost layer belts were laid up and vulcanized and these layers were preliminarily separated over a width of 2.5 cm. The separation was caused to proceed at 100° C. under the test settings of an amplitude of 3 mm and 330 RPM and the time till growth of separation to a length of 10 cm was taken as the dynamic separation life. In the table are shown, the relative lives taking the dynamic separation life for Comparative Example 4 as 100. The dynamic separation coverage value is the rubber attachment rate for the steel cord 10 as found in the observation of the 10 cm long portion undergoing separation. The data generated by this test indicated that, in the case of Example 1, the effect of anchoring the steel cord 10 in the rubber constituting the belt 8d is higher, thus inhibiting the progress of separation, as compared with Comparative Example 1.

Steel cords 10 were manufactured according to the respective examples of the invention illustrated in FIGS. 1, 4 and 5 and subjected to the dynamic separation test. The results of this test are shown in Table 3, as Example 2, Example 3 and Example 4, respectively. It should be understood, however, that the steel cord 10 of Example 2 was a twisted assembly of five constituent wires with a uniform diameter of 0.38 mm, with one of the wires, 13, having a larger shaping rate than that of the other four wires 12. The diameter differential d was 0.09 mm. In the steel cord 10 according to Example 3, four constituent wires 12 had a diameter of 0.38 mm, while the remaining wire 13 had a diameter of 0.45 mm. The radius differential d was 0.07 mm. In Example 4, the diameter of four constituent wires was 0.38 mm and that of the remaining one wire 13 was 0.30 mm. The radius differential was 0.08 mm. In all the examples, the twisting pitch of steel cord 10 was 6.5 mm and the elongation at break of the cord was comparable to that of Example 1.

The table also shows the characteristics of two comparative examples. Comparative Example 5 represents the single-strand steel cord illustrated in FIG. 11 and Comparative Example 6 represents the single-strand steel cord illustrated in FIG. 12.

These test results show that like the steel cord of Example 2 which was constructed by varying the shaping rate, the cords of Example 3 and 4, which were constructed by varying the wire diameter, are also useful.

In order that the elongation at break of steel cord 10 may be 4% or more, the relation of twisting pitch P and cord diameter D is set at P/D=4 through 8. By so doing, the wire gaps are increased to facilitate entry of the rubber. The degree of irregularity of steel cord 10, that is to say the diameter differential d, is preferably 5 to 50 percent of the diameter of the steel cord 10. If the value of d is less than 5%, no significant anchoring effect may be expected, while any value of d in excess of 50% results in an excess size of steel cord 10, which reduces the clearance from the adjacent cord and, hence, accelerates the propagation of separation.

Figure 7:
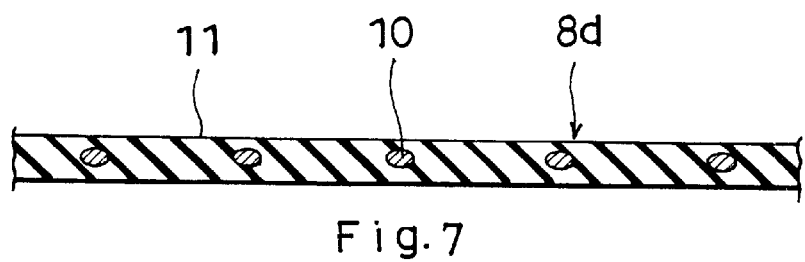
FIG. 7 is an exaggerated sectional view showing an example of the outermost rubber layer in FIG. 6.

A radial-ply tire sized 285/75 R 24.5 was manufactured using the steel cord 10 of FIG. 4 in the outermost layer belt 8d. FIG. 7 is a partial section view showing, on exaggerated scale, this outermost layer belt 8d. Each steel cord 10 is embedded in such a manner that the direction of maximum offset span of its circumscribing curve is substantially coincidental with the width direction of the outermost layer belt 8d. This alignment of the direction of maximum offset span with the width direction of the outermost belt 8d can be accomplished, for example, by orienting the steel cords 10 by means of grooves provided in a calender and topping the cords 10 with rubber from both sides to provide a rubber layer 11. This rubber layer 11 is further vulcanized. The steel cord 10 may, for example, have a maximum offset span D of 1.38 mm and a minimum offset span of 1.05 mm. In the case of this belt 8d, too, the cord density is 12 cords per 2.5 cm and the interval of cord ends may be uniform at 0.73 mm. Referring to this radial-ply tire, the characteristics of the steel cord 10, outermost layer belt 8d and tire are shown in Table 4, as Example 4. In the table, characteristics of two Comparative Examples are also shown. In Comparative Example 7, as in Example 5, the steel cord 10 having the construction illustrated in FIG. 4 was employed. However, as shown in the sectional view of the outermost layer belt 8e in FIG. 8, the direction of maximum offset span of the circumscribed curve is random. Therefore, the interval of cord ends is distributed over a broad range of 0.73 to 1.07 mm. In Comparative Example 8, the steel cord of FIG. 11 wherein the constituent wires have a common circumscribed circle was used in the outermost layer belt. The pneumatic tires according to these Comparative Examples are also radial-ply tires sized 285/75 R 24.5 as in Example 5 and the carcass 4 and inner three belts 8a, 8b and 8c were the same as those in Example 5.

The outermost belts of Example 5 and Comparative Example 7 are superior to the outermost belt of Comparative Example 8 in the anchor effect for steel cords with respect to the rubber constituting the belts and in the entry of rubber. Therefore, the incidence and growth of separation are better inhibited. The same table shows the number of belt penetrations by nails in the 100,000 kilometer driving trial. In the case of Example 5, there was no penetration at all. Though not shown in this table, the pneumatic tire according to Example 5 not only has an anti-cut performance comparable to that of the tire representing the multi-strand steel cord structure but shows an improved wire tenacity utilization rate as compared with the multi-strand construction.

The number of belts in which steel cords 10 are embedded may be appropriately increased as required. For example, the two belts 8c and 8d closer to the tread may have steel cords 10 embedded. It should also be understood that while the foregoing description is directed to radial-ply tires, this invention is equally applicable to the breakers in bias-ply tires.

TABLE 1

|  | Example 1 | Comparative Example 1 | Comparative Example 2 | Comparative Example 3 | Comparative Example 4 |
| --- | --- | --- | --- | --- | --- |
| Steel cord |  |  |  |  |  |
| Construction | Single-strand 1 × 5 × 0.38 (FIG. 1) | Single-strand 1 × 5 × 0.38 (FIG. 11) | Multi-strand 4 × 4 × 0.23 (FIG. 9) | Multi-strand 3 × 7 × 0.22 (FIG. 10) | Single-strand 1 × 5 × 0.38 (FIG. 12) |
| Offset span (mm) | 0.06 | 0 | — | — | 0 |
| Twisting pitch (mm) | 6.5 | 6.5 | 3.5/5.5 | 4.0/7.5 | 18.0 |
| Tenacity at break (kg f) | 125 | 125 | 135 | 171 | 138 |
| Elongation at break (%) | 6.7 | 6.5 | 6.5 | 7.0 | 2.5 |
| Strength (kg f/mm$^2$) | 211 | 211 | 176 | 178 | 242 |
| Wire tenacity utilization rate (%) | 84 | 84 | 73 | 76 | 96 |

TABLE 1-continued

|  | Example 1 | Comparative Example 1 | Comparative Example 2 | Comparative Example 3 | Comparative Example 4 |
|---|---|---|---|---|---|
| Damping property (index) | 130 | 125 | 126 | 130 | 100 |
| Flexural hardness (index) | 98 | 96 | 48 | 42 | 100 |
| Weight per unit length (g/m) | 4.66 | 4.65 | 6.03 | 7.53 | 4.48 |

TABLE 2

|  |  | Example 1 | Comparative Example 1 | Comparative Example 2 | Comparative Example 3 | Comparative Example 4 |
|---|---|---|---|---|---|---|
| Outermost belt |  |  |  |  |  |  |
| Cord density (cords/2.5 cm) |  | 12.0 | 12.0 | 11.0 | 8.8 | 10.9 |
| Overall weight of cord (index) |  | 114 | 114 | 137 | 136 | 100 |
| Entry of rubber |  | Good | Good | Fair | No | No |
| Percent dynamic separation life |  | 130 | 98 | 125 | 121 | 100 |
| Dynamic separation coverage (%) |  | 98 | 60 | 87 | 85 | 51 |
| Tire |  |  |  |  |  |  |
| Weight (kg) |  | 53.2 | 54.0 | 54.8 | 54.9 | 53.8 |
| Test data |  |  |  |  |  |  |
| Drum test durability |  | Pass | Pass | Pass | Pass | Pass |
| Rugged road driving test | Cuts reaching the belt (index) | 66 | 76 | 80 | 78 | 100 |
|  | Incidence of cord cutting (%) | 40 | 52 | 48 | 54 | 85 |
|  | Incidence of belt separation (%) | 0 | 0 | 25 | 40 | 75 |
| Rolling resistance (index) |  | 100 | 102 | 108 | 107 | 100 |

TABLE 3

|  | Example 2 | Example 3 | Example 4 | Comparative Example 5 | Comparative Example 6 |
|---|---|---|---|---|---|
| Steel cord |  |  |  |  |  |
| Construction | Single-strand 1 × 5 × 0.38 (FIG. 1) | Single-strand 1 × 4 × 0.38 + 1 × 0.45 (FIG. 4) | Single-strand 1 × 4 × 0.38 + 1 × 0.30 (FIG. 5) | Single-strand 1 × 5 × 0.38 (FIG. 11) | Single-strand 1 × 5 × 0.38 (FIG. 12) |
| Offset span (mm) | 0.09 | 0.07 | 0.08 | 0 | 0 |
| Twisting pitch (mm) | 6.5 | 6.5 | 6.5 | 6.5 | 18.0 |
| Belt |  |  |  |  |  |
| Percent dynamic separation life | 135 | 130 | 139 | 95 | 100 |
| Dynamic separation coverage (%) | 99 | 98 | 99 | 72 | 48 |

TABLE 4

|  | Example 5 | Comparative Example 7 | Comparative Example 8 |
|---|---|---|---|
| Steel cord |  |  |  |
| Construction | Single-strand 1 × 4 × 0.38 + 1 × 0.45 (FIG. 4) | Single-strand 1 × 4 × 0.38 + 1 × 0.45 (FIG. 4) | Single-strand 1 × 5 × 0.38 (FIG.11) |
| Maximum offset span D (mm) | 1.38 | 1.38 | 1.15 |
| Minimum offset span D (mm) | 1.05 | 1.05 | 1.15 |

TABLE 4-continued

Figure 8:
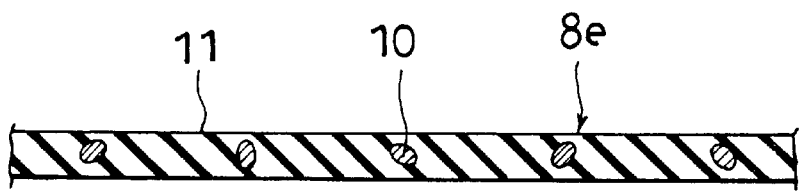
FIG. 8 is an exaggerated sectional view showing a comparative example in regard to the outermost rubber layer shown in FIG. 7.

|  | Example 5 | Comparative Example 7 | Comparative Example 8 |
|---|---|---|---|
| Outermost belt |  |  |  |
| Cord layout | FIG. 7 | FIG. 8 | — |
| Cord density (cords/2.5 cm) | 12.0 | 12.0 | 12.0 |
| Cord end interval (mm) | 0.73 | 0.73–1.07 | 0.97 |
| Entry of rubber | Good | Good | Fair |
| Number of nails penetrating the belt | 0 | 3 | 2 |

What is claimed is:

1. A pneumatic tire comprising:

a carcass;

a tread, belt layers between the carcass and the tread;

at least an outermost belt layer of the belt layers being reinforced by a plurality of steel cords each including a plurility of constituent wires and having a single-strand structure;

each of said steel cords having an elongation at break of greater than 5.5%; and at least one wire of the constituent wires of each of the steel cords differing in shaping rate from remaining wires of said constituent wires wherein the shaping rate is a ratio of a diameter of a circumcircle defined by a hypothetical cord formed of a plurality of wires, with the plurality of wires being shaped, to a diameter of a circumcircle defined by the hypothetical cord with the plurality of wires not being shaped and each of the plurality of wires contacting neighboring ones of the plurality of wires.

2. The pneumatic tire of claim 1, in which substantially all of said steel cords of said outermost belt layer have a direction of maximum offset span of the circumcircle substantially coincidental with a width direction of said outermost belt layer.

* * * * *